United States Patent [19]

Senoo

[11] Patent Number: 4,663,754
[45] Date of Patent: May 5, 1987

[54] REMOTE CONTROL SYSTEM FOR DATA COMMUNICATION UTILIZING MODEMS

[75] Inventor: Keiichi Senoo, Tokyo, Japan

[73] Assignee: NEC Corporation, Tokyo, Japan

[21] Appl. No.: 778,494

[22] Filed: Sep. 20, 1985

[30] Foreign Application Priority Data

Sep. 26, 1984 [JP] Japan .................. 59-199450

[51] Int. Cl.[4] .......................... H04J 1/16; H04J 3/02; H04J 3/12
[52] U.S. Cl. ........................ 370/13; 370/85; 370/110.1
[58] Field of Search .................. 370/85, 94, 60, 110.1, 370/13, 15; 375/7, 121

[56] References Cited

U.S. PATENT DOCUMENTS

3,996,553 12/1976 Siems et al. ............................ 370/85
4,597,073 6/1986 Staples ..................................... 375/7

Primary Examiner—Douglas W. Olms
Assistant Examiner—Frank M. Scutch, III
Attorney, Agent, or Firm—Laff, Whitesel, Conte & Saret

[57] ABSTRACT

A remote control system for data communication includes a local modem as an initiating modem and a remote modem as a responding modem coupled by an analog duplexed channel, and a pair of intermediate modems coupled by a digital duplexed channel, inserted between the initiating and the responding modes. Each intermediate modem includes communication control circuitry to translate a port designation from the initiating modem into a port designation corresponding to the responding modem. Thus, the system makes it possible to simply designate a port of the remote modem to effect designation of a corresponding port of the local modem with the initiating modem having no information indicating correspondence between the port of the responding modem and those of the initiating modem.

7 Claims, 9 Drawing Figures

REMOTE CONTROL SYSTEM FOR DATA COMMUNICATION UTILIZING MODEMS

BACKGROUND OF THE INVENTION

The present invention relates to a remote control system for data communication utilizing modems (modulator-demondulator) with multiplexing function, and more particularly to a remote control system having a function to effect port designation of a responding modem remote from an initiating modem by using a secondary channel for performing error test of communication channel.

When employing a modem having multiplexing function as a remote modem in a remote control system for data communication utilizing modems, it is required in many applications to designate one port among a plurality of ports for performing such a remote control.

In accordance with this system, when designating a port of a remote modem as a responding modem from a local modem as an initiating modem, an operation is effected to notice a multiplexed port number of the remote modem from the local modem to the remote modem via a secondary channel which is not open to users. However, the drawback with the above-mentioned conventional system is as follows. In case where an error test is conducted by looping back port designation signal at the designated port of the remote modem to feed it back to the local modem, it is required that the port number noticed or reported via secondary channel be equal to the number of the port at which the port designation is looped back. For this reason, the local modem requires information as to correlative relationship between port numbers of the local modem and those of the remote modem. As a result, an erroneous designation of port numbers will cause serious communication faults such that communication function of the channel erroneously designated is down.

SUMMARY OF THE INVENTION

With the above in view, an object of the present invention is to provide a highly reliable remote control system for data communication utilizing modems.

Another object of the present invention is to provide a remote control system capable of designating a port of a remote modem by simply designating a port of a local modem with the remote modem having no information in connection with correlative relation between port numbers of the local modem and those of the remote modem.

According to the present invention, there is provided a remote control system for data communication utilizing modems including initiating and responding modem means with multiplexing function coupled by analog primary and secondary channels, and at least a pair of intermediate modem means with multiplexing function coupled by digital primary and secondary channels, inserted between the initiating and responding modem means, the pair of intermediate modem means comprising first intermediate modem means located on the side of said initiating modem means and second intermediate modem means located on the side of said responding modem means, the communication system having a function to effect a port designation of said responding modem means in response to a command indicative of port designation transmitted from said initiating modem means via the pair of intermediate modem means by utilizing each of the analog and digital secondary channels, characterized in that the first intermediate modem means comprises first communication control means, and first terminal equipment interface means coupled to the first communication control means through a first input and output circuit having a plurality of ports, wherein when the first communication control means receives control information from the initiating modem means via the analog secondary channel to detect specified coded information including a multiplexed port number, the first communication control means is operative to allow a specified output signal line of the first terminal equipment interface means coupled to a port corresponding to the thus detected multiplexed port number to be in on-state and to transmit the control information to the second intermediate modem means via the digital secondary channel; the second intermediate modem means comprises second communication control means, and second terminal equipment interface means coupled to the second communication control means through a second input and output circuit having a plurality of ports, wherein when the second communication control means receives control information from first intermediate modem means via the digital secondary channel to detect the specified coded information including the port number, the second communication control means is operative to identify a port at which a specified input signal line of the second terminal equipment interface means is in on-state so as to rewrite the port number included in the control information by using a number assigned to the port which has been identified as on, and to transmit control information including the thus rewritten port number to the responding modem means via said analog secondary channel; and specified output signal lines of the first terminal equipment interface means coupled to ports of the first input and output circuit provided in the first intermediate modem means and specified input signal lines of the second terminal equipment interface means coupled to ports of the second input and output circuit provided in the second intermediate modem means being connected to each other through individual corresponding ports.

BRIEF DESCRIPTION OF THE DRAWINGS

The features and advantages of a remote control system for data communication utilizing modem function will become more apparent from the following description taken in conjunction with the accompanying drawings, in which.

DETAILED DESCRIPTION OF THE PREFERRED EMBODIMENT

Prior to description of a preferred embodiment of the invention, a typical form of a conventional remote control system for data communication utilizing modem function will first be described in brief.

Figure 1:
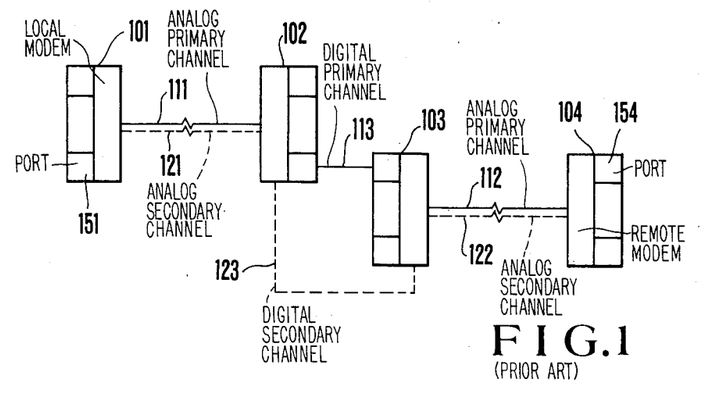
FIG. 1 is a block diagram illustrating a conventional remote control system for data communication utilizing modem function.

As shown in FIG. 1, a conventional remote control system comprises four modems 101, 102, 103 and 104 with multiplexing function. The first modem 101 serving as a local modem and the second modem 102 are coupled by analog primary and secondary channels 111 and 121. The second modem 102 and the third modem 103 are coupled by digital primary and secondary channels 113 and 123. The third modem 103 and the fourth modem 104 serving as a remote modem are coupled by analog primary and secondary channels 112 and 122. In accordance with this system, when designating a port 154 of the remote modem 104 from the local modem 101, an operation is effected to notice a multiplexed port number 154 of the remote modem 104 from the local modem 101. However, this conventional system is not practically acceptable for the reason stated below. For instance, in case where an error test is carried out by looping back a port designation signal at the designated port 154 of the remote modem 104 to feed it back to the local modem 101, it is required that the port number noticed via the secondary channel be equal to the number of the port 154 at which the port designation is looped back. Accordingly, the local modem requires information as to correlative relationship between port numbers of the local modems and those of the remote modem. As a result, in the event that a port number is erroneously designated, this results in serious communication faults such that communication function of the channel erroneously designated is down.

A preferred embodiment of the present invention proposed so as to overcome the problem with the above-mentioned conventional system will be described in detail with reference to attached drawings.

Figure 2:
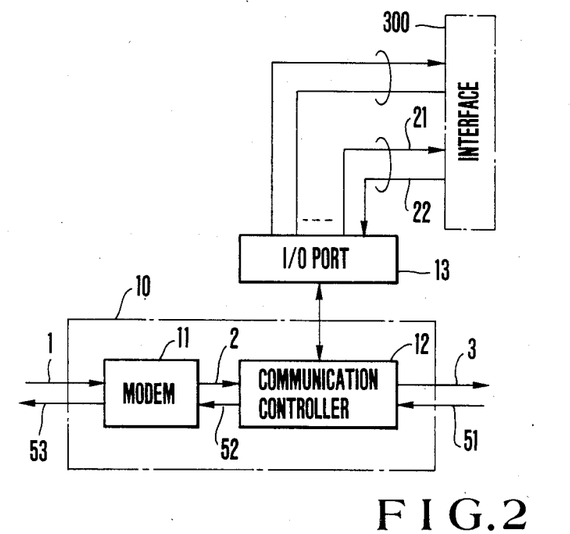
FIG. 2 ia a block diagram illustrating an example of a remote control circuit included in a modem with multiplexing function employed in a remote control system according to the present invention.

A remote control system for data communication utilizing modem function according to the present invention has the same system construction as the prior art system shown in FIG. 1. This remote control system of the invention includes a plurality of modems with multiplexing function linked with each other as will be discussed with reference to FIG. 3. FIG. 2 shows an internal circuit configuration of each modem employed in the present invention. The i-th modem Mi comprises a communication control unit 10 comprising a modem circuit 11 coupled to the analog secondary channel of a modem upstream of the modem Mi, and a communication controller 12 coupled between the modem circuit 11 and a modem downstream of the modem Mi, an input/output (I/O) circuit 13 having a plurality of ports coupled to the communication controller 12, and a terminal equipment interface 300 having input/output signal lines coupled to the plurality of ports, respectively. The modem circuit 11 is operative to demodulate analog signal 1 received from an analog secondary channel to output a received data 2 to the communication controller 12. The communication controller 12 is operative to allow a CT 142 interface signal 21 for the terminal equipment (DTE) interface at the port equal to a port number included in the received data 2 to be in on-state through the I/O port 13, and to transmit the received data 2 via the digital secondary channel as a transmit data. Further, the communication controller 12 which in turn has received a signal from the digital secondary channel is operative to detect a port at which a CT 140 interface signal 22 for the modem DTE interface is in on-state through the I/O port 13 so as to rewrite a port number included in the received signal 51 by using a number of the port at which the CT 140 interface signal 22 is in on-state, thereby to output a transmit signal 52 thus rewritten to the modem 11 whereby the transmit signal 53 is modulated into an analog signal. For further details of the DTE interface, CT 140 interface signal and CT 142 interface signal, reference should be made to a report by CCITT VIIth Plenary Assembly, Geneva, 10–21 Nov., 1980, pages 97 to 112.

Figure 3:
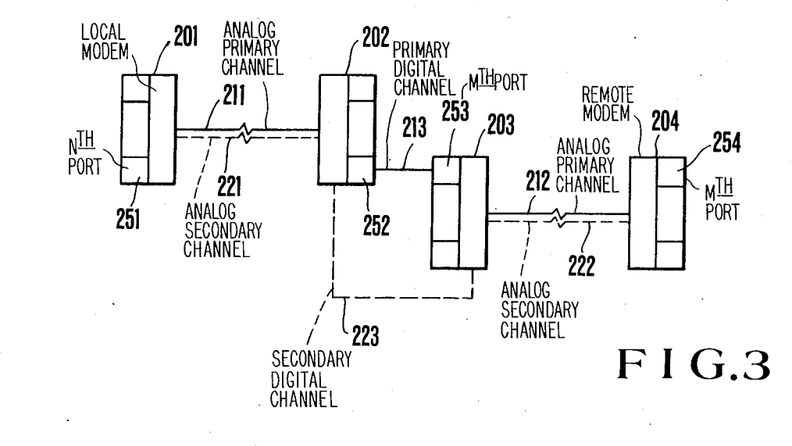
FIG. 3 is a block diagram illustrating an embodiment of a remote control system for data communication of a remote control system for data communication wherein the system comprises four modems with multiplexing function each including the remote control circuit shown in FIG. 2.

Referring to FIG. 3, there is shown an embodiment of a remote control system according to the present invention wherein modems with multiplexing function in which the remote control circuit shown in FIG. 2 is incorporated are connected in tandem.

The remote control system of this embodiment comprises four modems 201, 202, 203 and 204 with multiplexing function. The first modem 201 as a local modem and the second modem 202 are coupled by analog primary and secondary channels 211 and 221. The second modem 202 and the third modem 203 are coupled by digital primary and secondary channels 213 and 223. The third modem 203 and the fourth modem 204 are coupled by analog primary and secondary channels 212 and 222.

The above-mentioned CT 142 interface signal 21 for the DTE interface provided in the modem 202 is connected to the above-mentioned CT 140 interface signal 22 for the DTE interface provided in the modem 203. Conversely, the CT 142 interface signal 21 for the DTE interface provided in the modem 203 is connected to the CT 140 interface signal 22 for the DTE interface provided in the modem 202.

The operation of the remote control system thus configured will be described with reference to FIGS. 4, 5A, 5B, 6A, 6B and 6C.

It is assumed that a port 254 of the remote modem 204 is designated on the basis of a port designation from the local modem 201 in order to perform an error test.

Figure 4:
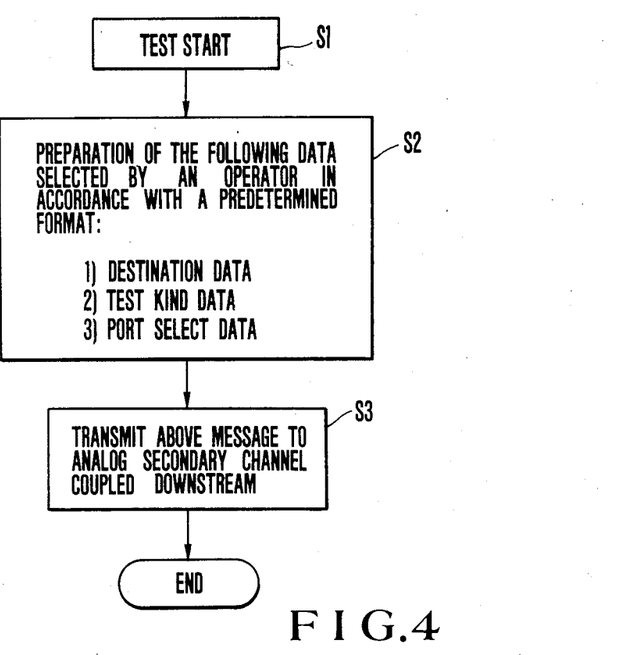
FIG. 4 shows a flow of transmitting a test command message employed in the system according to the present invention.
Figure 5A:
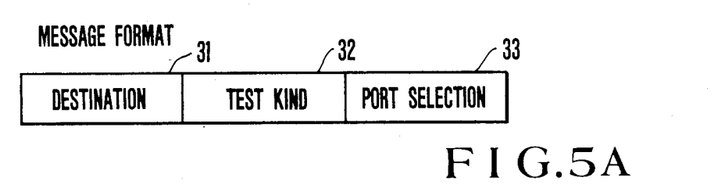
FIGS. 5A and 5B show an example of a format of the test command message and a bit sequence of a port select data employed in the system according to the present invention, respectively.
Figure 5B:
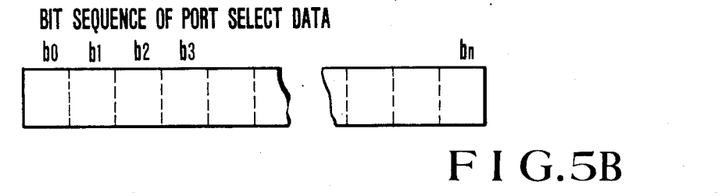

FIG. 4 shows a procedure to transmit a test command message for effecting an error test by effecting a port designation of the remote modem 204. FIG. 5A shows a format of the test command message wherein the message format comprises a destination data field 31, a test kind field 32 and a port select data field 33. The port select data has a bit sequence comprising a plurality of bits (bo, . . . bn) as shown in FIG. 5B.

When an error test is initiated (step S1 in FIG. 4), destination data, test kind data and port select data selected by an operator are prepared in accordance with the message format shown in FIG. 5A (step S2). In this example, the port select data includes information in regard to the number of the n-th port 251 of the local modem 201. The test command message thus prepared is transmitted to the analog secondary channel 221 downstream of the local modem 201 (step S3).

Figure 6A:
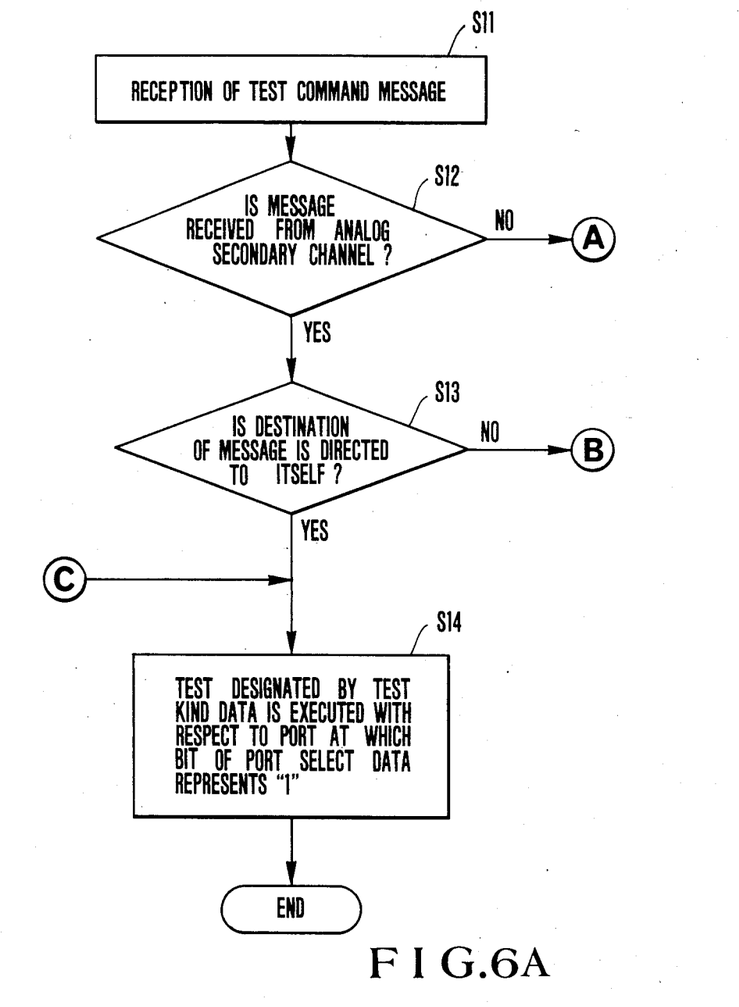
FIGS. 6A to 6C show a flow of receiving operation of the test command employed in the system according to the present invention.
Figure 6B:
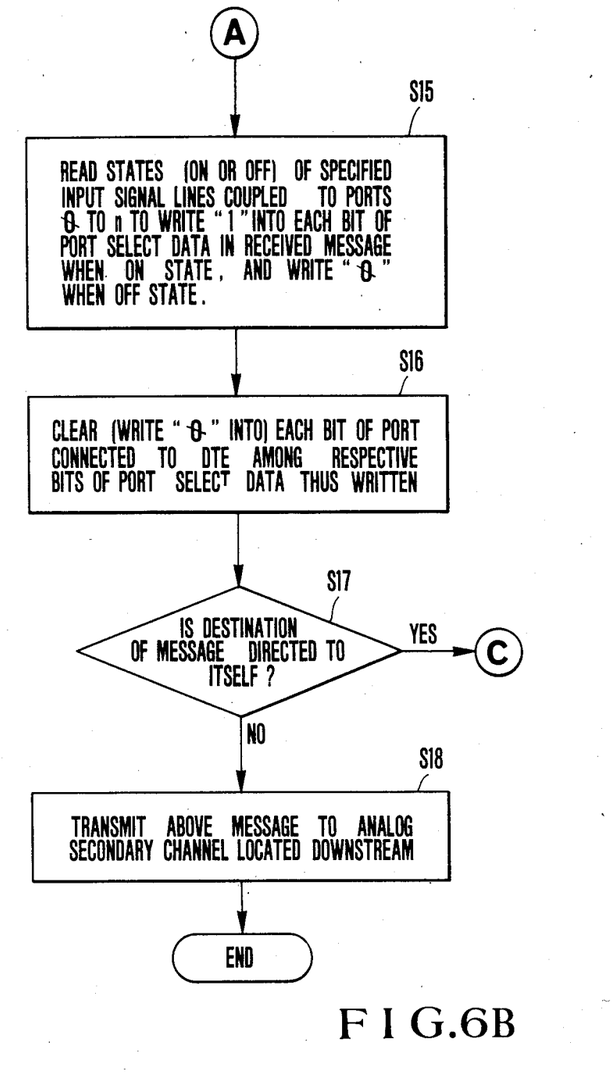
Figure 6C:
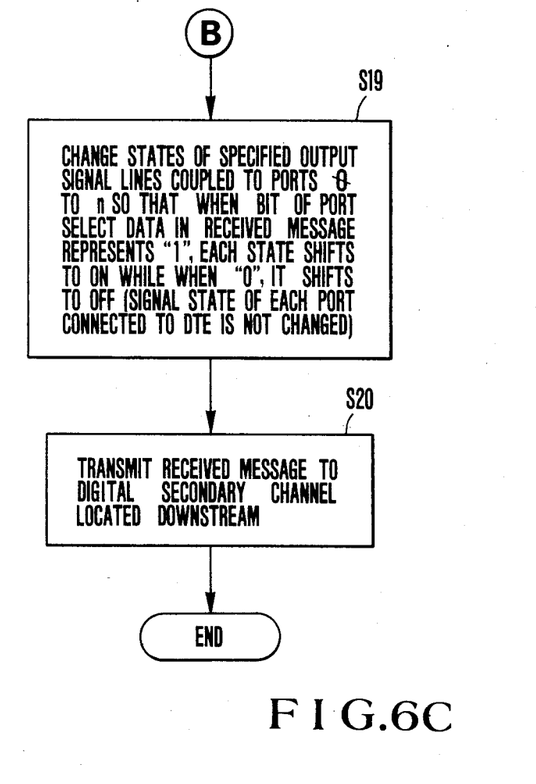

FIGS. 6A to 6C show a receiving procedure of the test command message.

In response to the reception of the test command message, the modem 202 initiates a receiving processing (step S11 in FIG. 6A). Then, an operation is effected to identify as to whether the received information corresponds to the test command message received from the analog secondary channel or not (step S12 in FIG. 6A). Next step is to identify as to whether the destination of the message is directed to itself or not (step S13 in FIG. 6A). In this instance, since the destination of the message is not directed to the modem 202, the procedure branches to step S19 shown in FIG. 6C to change states of specified output signal lines coupled to ports 0 to n so that when the bit of port select data in the received message represents "1", each state shifts to on, while when "0", it shifts to off. It is to be noted that the signal state of each port connected to the DTE is not changed. In this example, the modem 202 allows the CT 142 interface signal of the n-th port 252 having a port number n to be in on-state to transmit the received message to the digital secondary channel 223 (step S20 in FIG. 6C).

When the modem 203 has received the test command message transmitted from the modem 202, the modem 203 executes the processings shown in steps S11 and S12. In this instance, since the message is received from the digital secondary channel 223, the procedure branches to step S15 to read states (or on/off) of the specified input signal lines coupled to ports 0 to n to write logical "1" into each bit of port select data in the received message when the specified input signal lines are in on-state, and write logical "0" thereinto when off-state. Next step is to clear (write logical "0" into) each bit of port connected to the DET among respective bits of port select data thus written (step S16 in FIG. 6B). Next step is identify as to whether the destination of the message is directed to itself (step S17 in FIG. 6B). In this example, since the destination is not directed to the modem 203, next step is to transmit the message to the analog secondary channel 222. More particularly, the modem 203 becomes operative to detect that the CT 140 interface signal of the m-th port 253 having a number M of the modem 202 connected to the DTE interface of the port 252 of the modem 202 is in on-state, so as to rewrite the port number N in the received message by using the port number M of the m-th port 253, thus transmitting the message including the port number M to the analog secondary channel 222.

When the remote modem 204 has received the message transmitted from the modem 203 via the analog secondary channel 222, the remote modem 204 executes the processing similar to the above (steps S11 and S12). As a result of the execution of the step S13, it is judged that the destination of the message is directed to itself. Accordingly, next step is to execute the test designated by the test kind data with respect to the port at which bit of port select data represents logical "1" (step S14). Thus, in this example, the remote modem 204 can recognize the m-th port 254 having number M of the remote modem 204 corresponding to the n-th port 251 having port number N of the local modem 101.

As far as being cooperative with the DTE interface, the CT 140 and CT 142 interface signals are essentially used respectively as a loop-back control signal from the DTE, and a signal to the DTE for informing the DTE of a test in progress. However, in the case where the CT 140 and 142 interface signals are connected to the DCE (data circuit-terminating equipment), the above-mentioned functions are not always fulfilled. Further, it is apparent that other DTE interface signals which do not affect the primary channel may substitute for the CT 140 and CT 142 interface signals employed in the previous embodiment of the invention.

As described above, the system according to the present invention makes it possible to designate, in a simplified manner, ports of the remote modem corresponding to ports of the local modem with the local modem having no information indicative of correspondence between the ports of the remote modem and those of the local mode.

What is claimed is:

1. In a remote control system for data communication utilizing modems including initiating and responding modem means with multiplexing function coupled by analog primary and secondary channels, and at least a pair of intermediate modem means with multiplexing function coupled by digital primary and secondary channels, inserted between said initiating and responding modem means, said pair of intermediate modem means comprising first intermediate modem means located on the side of said initiating modem means and second intermediate modem means located on the side of said responding modem means, said communication system having a function to effect a port designation of said responding modem means in response to a command indicative of port designation transmitted from said initiating modem means via said pair of intermediate modem means by utilizing each of said analog and digital secondary channels, the improvement wherein (a) said first intermediate modem means comprises first communication control means, and first terminal equipment interface means coupled to said first communication control means through a first input and output circuit having a plurality of ports, wherein when said first communication control means receives control information from said initiating modem means via said analog secondary channel to detect specified coded information including a multiplexed port number, said first communication control means is operative to allow a specified output signal line of said first terminal equipment interface means coupled to a port corresponding to said thus detected multiplexed port number to be in on-state and to transmit said control information to said second intermediate modem means via said digital secondary channel;

(b) said second intermediate modem means comprises second communication control means, and second terminal equipment interface means coupled to said second communication control means through a second input and output circuit having a plurality of ports, wherein when said second communication control means receives control information from first intermediate modem means via said digital secondary channel to detect said specified coded information including said port number, said second communication control means is operative to identify a port at which a specified input signal line of said second terminal equipment interface means is in on-state so as to rewrite said port number included in said control information by using a number assigned to said port which has been identified as on, and to transmit control information including said thus rewritten port number to said responding modem means via said analog secondary channel; and (c) specified output signal lines of said first terminal equipment interface means coupled to ports of said first input and output circuit provided in said first intermediate modem means and specified input signal lines of said second terminal equipment interface means coupled to ports of said second input and output circuit provided in said second intermediate modem means being connected to each other through individual corresponding ports.

2. A communication system as set forth in claim 1, wherein said first communication control means comprises a modem, and a communication controller, said modem being operative to demodulate an analog signal received from said initiating modem means to output a received data to said communication controller and to modulate a transmit signal from said responding modem means so as to transmit an analog signal thus modulated to said initiating modem means, said communication controller being operative to substantially perform said function of said communication control means.

3. A communication system as set forth in claim 1, wherein a message for effecting said port designation has a format comprising a destination data field, a test kind data field and a port select data field.

4. A communication system as set forth in claim 3, wherein said port select data comprises a plurality of bits corresponding to respective bits.

5. A communication system as set forth in claim 4, wherein said communication system has an error test function performed by using said message as a test command message.

6. A communication system as set forth in claim 5, wherein a procedure for transmitting the test command message comprises the steps of preparing the destination data, the test kind data and the port selection data selected by an operator in accordance with said format, and transmitting said test command message to the analog secondary channel located downstream.

7. A communication system as set forth in claim 6, wherein a procedure for receiving said test command message comprises:

(a) a first phase to detect as to whether said test command message is received from said analog secondary channel or not, (b) a second phase executed when reception of said test command message is detected, said second phase performing a processing for detecting as to whether destination of message is directed to itself or not, (c) a third phase executed when it is detected that destination of message is directed to itself, said third phase performing a processing for a test designated by said test kind data with respect to port at which bit of port selection data represents logical "1", (d) a fourth phase executed when reception of said test command message is not detected, said fourth phase comprising (d-1) a first subphase to read states of specified input signal lines coupled to said plurality of ports to write logical "1" into each bit of selection port data in received message when on state, and to write logical "0" thereinto when off state, (d-2) a second subphase to clear each bit of ports connected to said terminal equipment interface means among respective bits of selection port data thus written, (d-3) a third subphase to detect as to whether destination of said test command message is directed to itself, (d-4) a fourth subphase executed when destination of said test command message is not directed to itself, said fourth subphase performing a processing to transmit said test command message to said analog secondary channel located downstream, (d-5) a fifth subphase executed when destination of said test command message is not directed to itself, said fifth subphase performing a processing to change states of specified output signal lines coupled to said plurality of port so that when port select data in said received message represents logical "1", each state shifts to on, while when "0", it shifts to off, and (d-6) a sixth subphase to transmit said received message to said digital secondary channel located downstream.

* * * * *